United States Patent [19]

Helgorsky et al.

[11] 3,933,630
[45] Jan. 20, 1976

[54] PURIFICATION OF WASTE WATER CONTAINING PHTHALIC ESTERS

[75] Inventors: Jacques Helgorsky, Fretillon; Michel Auroy, Chauny, both of France

[73] Assignee: Rhone-Progil, Courbevoie, France

[22] Filed: Sept. 3, 1974

[21] Appl. No.: 502,899

[30] Foreign Application Priority Data
Sept. 12, 1973 France............................ 73.32732

[52] U.S. Cl................ 210/21; 210/475 R; 210/705
[51] Int. Cl.².......................................... B01D 11/00
[58] Field of Search....... 210/21; 260/475 R, 643 D, 260/705

[56] References Cited

UNITED STATES PATENTS

| | | | |
|---|---|---|---|
| 2,644,009 | 6/1953 | Cash et al. | 260/475 R |
| 3,476,796 | 11/1966 | Kubu et al. | 260/475 R |

*Primary Examiner*—Frank A. Spear, Jr.
*Attorney, Agent, or Firm*—McDougall, Hersh & Scott

[57] ABSTRACT

A process for the treatment of waste waters from the preparation of phthalic esters of alcohols to reduce the BOD and recover alcohols comprising treating the waste water with a strong acid and then extracting the acidified waste water with an alcohol, preferably the same as the alcohol used to form the phthalic ester.

11 Claims, 1 Drawing Figure

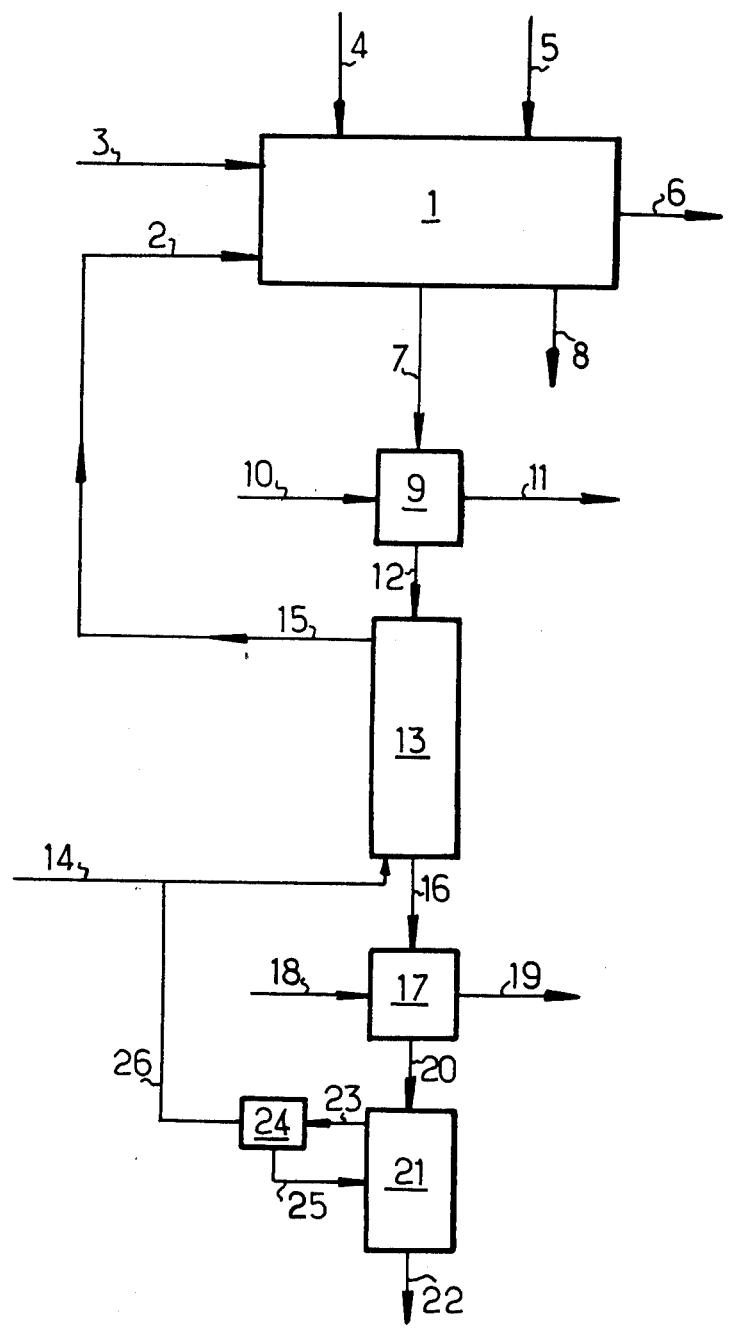

PURIFICATION OF WASTE WATER CONTAINING PHTHALIC ESTERS

The present invention concerns a process for purifying waste water containing phthalic esters, e.g. that resulting from the production of dialkyl phthalates, in particular orthophthalates of higher alcohols.

One of the processes which is most widely used on an industrial scale for the production of dialkyl phthalates is esterification of the corresponding alcohol by phthalic anhydride or acid in the presence of sulfuric acid acting as a catalyst.

In this reaction, besides the dialkyl phthalate, there is also formed a certain number of neutral or acid esters resulting from the reactions as between the alcohol used and the phthalic and sulfuric acids. In order to purify the dialkyl phthalate, the neutral or acid esters are subjected to a series of operations: careful hydrolysis of the esters, destruction of the neutral alkyl sulfate, neutralization of the acid functions by a base, washing operations, or decantation operations; this results in waste waters comprising all the water-soluble impurities from the process and particularly the salts of organic acid, and a small amount of the unreacted starting materials for the esterification operation.

Before discharging such waste waters, it is essential that they be subjected to a treatment for removing the major part of the organic molecules. The organic material content is conveniently represented by the "biological oxygen demand" referred to for the sake of brevity as "BOD", and it is common for the waste water from a phthalate-producing factory to have a BOD of 20,000 mg/l of oxygen, whereas often the standards set by the administrative services for protection of the environment will accept discharge only of water having a very low BOD. Moreover, most of the substances present in the waste water are due to the excess amounts of the starting materials; alcohol, phthalic acid, sulfuric acid, which are necessitated by the technical and economic constraints of the procedure for preparing the dialkyl phthalate and in particular due to the secondary reactions which such materials cause.

Most of the conventional treatment processes applied to waste water (flocculation, absorption on activated carbon, chemical oxidation, microbian digestion) are of low efficiency, expensive, and do not permit recovery of the organic materials.

In order to facilitate separation and recovery of the organic compounds, it has been proposed that the waste water should be subjected to an operation to hydrolyze the alkyl phthalates and sulfates in acid medium, followed by a neutralization operation and an operation for recovery of the alcohol by decantation. This process, which makes if possible to recover the alcohol, is however not sufficiently efficient for "depollution", as it does not separate the phthalates and as it also requires fairly strict hydrolysis conditions, namely 200°C at a pressure of 20 bars, this resulting in substantial capital investment and operating costs.

The present invention provides a process for the purification of waste water containing one or more phthalic esters of alcohols having more than 4 carbon atoms, which comprises acidification of the waste water by a strong acid to attain a free acidity of the waste water greater than 0.05N and extraction of the acidified water with an alcohol having more than 4 carbon atoms. Preferably the free acidity of the acidified water is from 0.05 to 0.5N.

In accordance with a particular embodiment of the process, sulfuric acid is used for the acidification operation, the amount being such that the treated waste water has a free acidity of more than 0.05N, preferably less than 0.5N.

In a preferred embodiment, the higher alcohol used for the extraction treatment is the same as the alcohol used for the esterification operation, and the organic extract is recycled to the esterification operation, possibly after removal of the unwanted impurities.

In a further embodiment, all the alcohol necessary for the esterification operation is used first for the operation of extracting the organic acid esters and acids. In accordance with an alternative embodiment, only a fraction of the alcohol necessary for the esterification operation is used for the extraction treatment of the waste water.

In a method of producing dioctyl ortho-phthalate (DOP), comprising esterification in aqueous medium of the o-phthalic acid or anhydride by means of octyl alcohol (2-ethylhexanol) with sulfuric acid as catalyst, partial hydrolysis of the neutral esters, neutralization of the mixture, and separation of the mixture into DOP and waste water, the process according to the invention comprises acidifying the waste water by means of sulfuric acid until it has a free acidity of from 0.15N to 0.5N and the acidified waste water is subjected to an extraction treatment by means of octyl alcohol, with separation of an aqueous solution which is discharged after recovery of the dissolved octyl alcohol, and an organic extract which is recycled to the esterification reaction vessel.

In a method of producing diisononyl ortho phthalate (DINP) by esterification of the o-phthalic anhydride or acid by means of isononanol with sulfuric acid as catalyst, and separation of the mixture into DINP and waste water, the process of the invention comprises acidifying the waste water by addition of sulfuric acid until it has a free acidity of from 0.05N to 0.20N, and that the acidified waste water is then subjected to an extraction treatment by means of isononanol with separation of an aqueous solution which is discharged after recovery of the isononanol, and an organic extract which is recycled to the esterification reaction vessel.

Sulfuric, hydrochloric and nitric acids can be mentioned as strong acids which can be used, although this list should not be considered as exhaustive.

The alcohols which can be used comprise branched or unbranched cyclic or aliphatic alcohols which are relatively insoluble in water, comprising at least four carbon atoms. By way of non-limiting example, mention can be made of butyl, amyl, hexyl, heptyl, octyl, nonyl, decyl, undecyl and dodecyl alcohols and their branched forms, for example isobutanol, 2-ethylhexanol and isononanol.

Use of the process on waste water resulting from the production of DOP and DINP will now be described by way of non-limiting illustration.

To facilitate the following description, the accompanying single FIGURE gives a flow diagram of the operations involved, the treatment of the waste water being purely and simply added onto a conventional production apparatus.

In the drawing, a rectangle 1 is used to denote the conventional production apparatus, with the feeds for the various raw materials, the intake or feed 2 for alcohol, feed 3 for phthalic acid, feed 4 for sulfuric acid, feed 5 for the basic material serving for the neutralization of the reaction mixture before separation of the DOP, and the discharges or outlets, namely 6 for the dialkyl phthalate, 7 for the waste water and 8 for the various purges. The conduit 7 leads into an acidification vessel 9 provided with stirrers and provided with a feed 10 for the sulfuric acid, and two discharges, one discharge 11 for gases and the other discharge 12 for the acidified waste water. The conduit 12 leads into a liquid-liquid extraction contactor vessel 13 (a vessel for extraction by liquid-liquid contact). The contactor vessel 13 is a known multi-stage apparatus. In the drawing the apparatus is indicated diagrammatically by a rectangle with the conduit 12 for the inlet of the acidified waste water, conduit 14 for the alcohol feed, outlet 15 for the alcohol charged with organic extract, which is returned to the apparatus 1, and the discharge 16 for the waste water which has been treated. The discharge 16 leads into a neutralizer 17 with a feed 18 for neutralizing material, a discharge 19 for the outlet of gas, an outlet 20 by means of which the neutralized water passes into a distillation apparatus 21, the final discharge 22 for the treated waste water, and an outlet 23 for the alcohol-water azeotrope.

The conduit 23 leads into a decanter 24 which carries out the separation into water, which is returned by way of a conduit 25 to the distillation apparatus, and alcohol, which is returned by way of conduit 26 to the conduit 14 leading to the contacting vessel 13. The mode of operation will be sufficiently apparent from the description, so that it is not specifically described, only particular features will be referred to in the course of the description of the numbered operations given by way of example.

EXAMPLE 1

This example relates to the treatment of the waste water from the production of DOP.

In the production of dioctyl phthalate, depending on the conditions of preparations, the waste water can contain variable concentrations of the following impurities: octanol (2-ethylhexanol), dioctyl phthalate, disodium phthalate, mixed sodium and octyl phthalate, mixed sodium and octyl sulfate, sodium sulfate, sodium carbonate, sodium acid carbonate or sodium hydroxide, the dioctyl sulfate having been hydrolyzed to acid sulfate and the liquid then being neutralized. Generally, the most abundant impurity is the mixed sodium and octyl sulfate, which is responsible for the greatest part of the biological oxygen demand (BOD) of the waste water.

By operating in accordance with the invention, it has been found that octanol was an effective extraction agent on the one hand as regards dioctyl phthalate and dioctyl sulfate which are contained in the waste water, and on the other hand as regards the organic acid esters and acids present, namely: phthalic acid, octyl acid phthalate and octyl acid sulfate. On the other hand, it is substantially ineffective as regards extracting sulfuric acid and it is virtually incapable of extracting the sodium salts of the organic acids, which are much too water-soluble.

Hereinafter, for the compounds contained in the acidified waste water, their partition coefficients (P) are given, that is to say, the ratio of their concentrations in the organic phase (octanol) and the aqueous phase (waste water). For example, in the presence of an excess of 0.3N sulfuric acid, the following partition coefficients (P) are obtained:

| P | dioctyl sulfate | $>10^3$ |
|---|---|---|
| P | dioctyl phthalate | $>10^3$ |
| P | phthalic acid and octyl acid phthalate | $>10$ |
| P | octyl acid sulfate | 4.8 |
| P | sulfuric acid | $<10^{-3}$ |

It is found that octanol extraction of the octyl acid sulfate, which is the main impurity in the waste water, is relatively easy, and that all the other impurities are extracted to an even greater degree.

Moreover, it was found possible to increase the partition coefficients of the weak organic acids, by increasing the free sulfuric acid concentration. Thus, the partition coefficient of octyl sulfate rises with the free acid concentration in the form sulfuric acid.

| Free acid as gram equivalent/liter | Partition coefficient of octyl acid sulfate |
|---|---|
| 0 | 0.4 |
| 0.05 | 1.2 |
| 0.1 | 2 |
| 0.2 | 3.4 |
| 0.3 | 4.8 |
| 0.4 | 6.0 |

The experiment was not continued beyond a value of free acidity of higher than 0.4N because, above that value, the process becomes burdensome in view of the amounts of $H_2SO_4$ required, and also the process has the disadvantage of resulting in the discharge of waste water which is excessively highly charged with alkali metal sulfates.

Extraction of the organic impurities contained in the waste water can thus be easily carried out by liquid extraction in a multi-stage contactor which receives in countercurrent flow, on the one hand, the octanol and, on the other hand, the acidified waste water containing the organic impurities resulting from the production process.

The waste solution issuing from the dioctyl phthalate production apparatus has the following composition:

| Dioctyl phthalate | 2 g/l |
|---|---|
| Octanol | 2 g/l |
| Sodium carbonate | 5 g/l |
| Sodium acid carbonate | 5 g/l |
| Sodium phthalate | 4 g/l |
| Mixed sodium and octyl phthalate | 1 g/l |
| Mixed sodium and octyl sulfate | 23 g/l |

The biological oxygen demand (BOD) of this solution is 20,000 mg of oxygen/liter.

By way of the conduit 7, this solution is introduced into the acidification vessel 9 at a rate of 1 m³/hour, at the same time as 28 kg/hour of sulfuric acid by way of the conduit 10. An acid solution is obtained at the outlet from the vessel 9, the composition of the acid solution being approximately:

| Dioctyl phthalate | 2 g/l |
|---|---|
| Octanol | 2 g/l |
| Phthalic acid | 1.3 g/l |
| Octyl acid phthalate | 1.1 g/l |
| Octyl acid sulfate | 21 g/l |
| Free sulfuric acid ($H_2SO_4$) | 13 g/l |
| Total non-organic sulfate (mineral sulfates + free sulfuric acid) expressed in | | the form of H₂SO₄        27 g/l

This solution is introduced by way of the conduit 12 into the first stage of a mixer-decanter installation 13 comprising five stages. Octanol (2-ethyl hexanol) at a flow rate of 1 m³/hour is injected by way of the conduit 14 at the inlet to the fifth stage of the installation 13.

An octanol extract is collected at the outlet from the first stage of the installation 13, the composition of the extract being as follows:

| | |
|---|---|
| Dioctyl phthalate | 2 g/l |
| Water | 25 g/l |
| Phthalic acid | 1.3 g/l |
| Octyl acid phthalate | 1.1 g/l |
| Octyl acid sulfate | ~21 g/l |
| Sulfuric acid | <0.01 g/l |

This octanol extract is passed by way of the conduit 15 into the installation 1 in which it takes part in esterification of the phthalic acid. The raffinate issuing from the fifth stage of the mixer-decanter installation 13 is of the following composition:

| | |
|---|---|
| Octanol | 1 g/l |
| Octyl acid sulfate | <0.02 g/l |
| Sulfuric acid | ~13 g/l |
| Total non-organic sulfate in the form H₂SO₄ | 27 g/l |

The residual BOD of this solution is 500 mg of oxygen/liter of refined waste water. This refined solution is then subjected to neutralization in the reaction vessel 17 by introducing 11 kg/hour of sodium hydroxide by way of the feed 18, then the solution, with a pH of 7, is passed by way of the conduit 20 into a distillation column 21 comprising ten theoretical stages and which supplies a distillate comprising the octanol-water azeotrope (BP 99.1°C; formed of 20% octanol and 80% water). After decantation in the decanter 24, the alcoholic phase is re-injected at the level of the fifth theoretical stage of the installation 13.

The distillation bottom product which is discharged by way of the conduit 22 has the following characteristics:

| | |
|---|---|
| Sodium sulfate | 40 g/l |
| BOD | 50 mg of oxygen per liter |

It can therefore be discharged into a river.

EXAMPLE 2

This example is identical to Example 1 except that treatment is on the waste water resulting from the production of diisononyl orthophthalate (DINP). In order not to encumber the present description, only the values and results which are absolutely necessary for evaluating the efficiency of the process will be given hereinafter.

Under the same conditions as described in the preceding Example, a solution issuing from a DINP production apparatus is treated; it has a BOD of 20,000 mg of oxygen/liter, which is due for the major part to the mixed isononyl sulfates and phthalates.

This solution is introduced into the vessel 9 of the above-described installation, all other values being equal except for the amount of sulfuric acid which is only 15 kg/hour. The solution issuing from the vessel 9 is introduced into the installation 13 by way of the conduit 12 and the isononanol is introduced in the fifth stage of the apparatus, by way of the conduit 14. The isononanol flow rate is 1 m³h. At the outlet from the first stage of the installation 13, there is collected an isononanol extract which is passed to the DINP production unit 1. The raffinate which is discharged through 16 from the fifth stage of the installation 13 has a BOD of 200 mg/l only, which is due mainly to the isononyl alcohol present.

After neutralization and distillation of the isononanol-water azeotrope (BP 98.5°C, formed of 30% isononanol and 70% water), there is produced a waste water which titrates:

| | |
|---|---|
| Sodium sulfate | 20 g/l |
| BOD | 50 mg of oxygen per liter |

We claim:
1. A process for the purification of waste water resulting from the production of phthalic esters by esterification of phthalic acid or anhydride with alcohols having more than 4 carbon atoms, which comprises acidifying the waste water with a strong acid to attain a free acidity of the waste water greater than 0.05 N and extracting the acidified water with an alcohol having more than 4 carbon atoms for removal of organic impurities from the acidified water.

2. A process according to claim 1, wherein the strong acid is sulfuric acid.

3. A process according to claim 1, wherein the alcohol used for the extraction is the same as that used to form the phthalic ester.

4. A process according to claim 1, wherein the waste water is from the acid-catalyzed esterification of a phthalic anhydride or acid with an alcohol having more than 4 carbon atoms.

5. A process according to claim 4, wherein all the alcohol necessary for the esterification step is derived from the alcohol used in the extraction step.

6. A process according to claim 4, wherein only part of the alcohol necessary for the esterification step is derived from the alcohol used in the extraction step.

7. A process according to claim 1, wherein the free acidity of the waste water after acidification is within the range of 0.05 to 0.5 N.

8. A process according to claim 4, wherein the waste water is from the industrial production of dioctyl (di-2-ethylhexyl) phthalate, the free acidity of the acidified waste water is from 0.15 to 0.5 N and the alcohol used for the extraction is octyl alcohol (2-ethylhexanol).

9. A process according to claim 4, wherein the waste water is from the industrial production of diisononyl phthalate, the free acidity of the acidified waste water is from 0.05 to 0.20 N and the alcohol used for the extraction is isononanol.

10. A process according to claim 1, which includes the step of separating the alcohol extract from a remaining organic phase and neutralizing the aqueous phase from the extraction step.

11. A process according to claim 10, which includes the step of distilling the neutralized aqueous phase to remove at least a portion of any residual alcohol.

* * * * *